C. J. BEASLEY.
POWER PRESS.
No. 113,246. Patented Apr. 4, 1871.
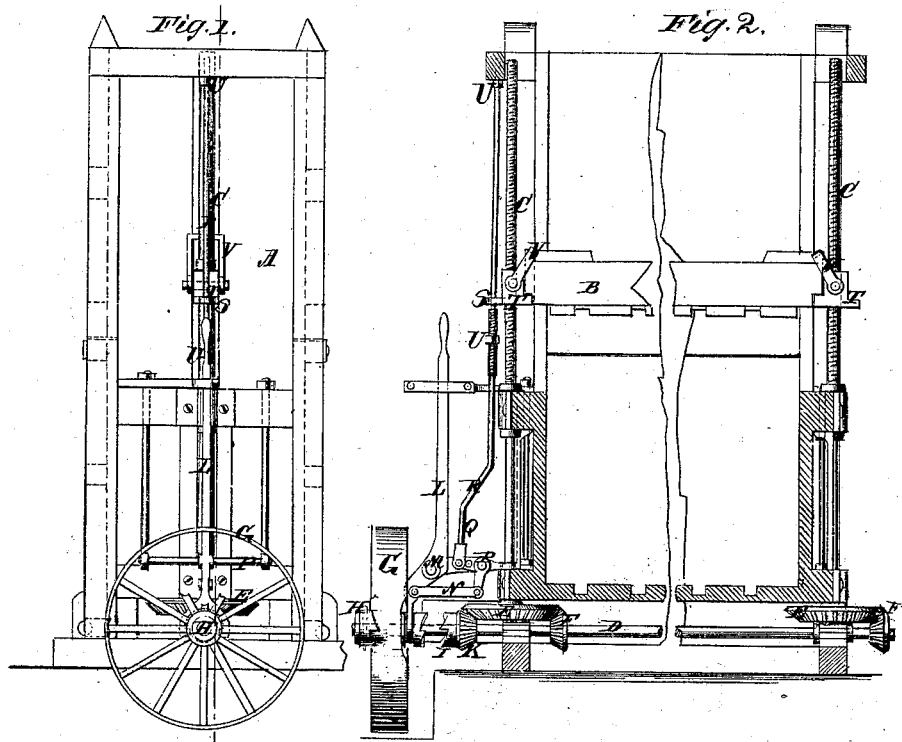
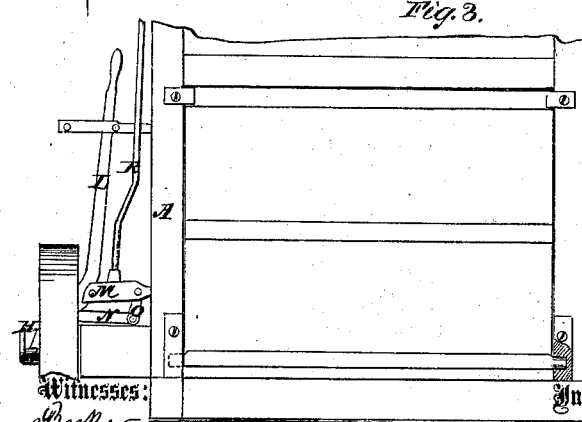

United States Patent Office.

CHARLES J. BEASLEY, OF PETERSBURG, VIRGINIA, ASSIGNOR TO TAPPEY, LUMSDEN & CO., OF SAME PLACE.

Letters Patent No. 113,246, dated April 4, 1871.

IMPROVEMENT IN POWER-PRESSES.

The Schedule referred to in these Letters Patent and making part of the same.

*To all whom it may concern:*

Be it known that I, CHARLES J. BEASLEY, of Petersburg, in the county of Dinwiddie and State of Virginia, have invented a new and useful Improvement in Power-Presses; and I do hereby declare that the following is a full, clear and exact description thereof, which will enable others skilled in the art to make and use the same, reference being had to the accompanying drawing forming part of this specification.

This invention relates to improvements in power-presses, for pressing hay, cotton, and the like; and It consists in a novel arrangement with a driving-shaft gearing with a pair of screws, by which the follower is worked; of a driving-wheel, connecting gears, and shifting apparatus therefor, by which the screws may be turned either way for moving the follower back and forth; and the disconnecting of the gears is automatically effected when the follower has arrived at the proper place for stopping.

Figure 1 is a side elevation of my improved press;
Figure 2 is a sectional elevation of the same; and
Figure 3 is a partial elevation of one of the sides, perpendicular to that shown in fig. 1.

Similar letters of reference indicate corresponding parts.

A represents a vertical case, of any approved kind.
B, the follower.
C, the screws for working said follower.
D, the driving-shaft, gearing with the wheels E on the said screws by means of pinions F, keyed to it; and
G is the pulley, by which the power is applied.

This pulley is fitted at each end of its hub to clutch with collars on said shaft, and is capable of sliding back and forth to connect with one or the other.

The one H is keyed to the shaft D, and imparts motion to it; the other is connected to the pinion K, working loosely on shaft D, and gearing with the wheel E, next to said driving-pulley G.

L is a shifting-lever, pivoted at M, and connected with the hub of wheel G for shifting it.

It is also connected by the link N with the arm O of a rock-shaft, P, to another arm, Q, of which the rod R is connected.

This rod rises up alongside of one of the screws passing through a hole in a projection, S, of the nut T, for said screw on the follower, and it carries at or about where the follower is required to stop, at the end of each movement, a stop-nut, V, which may be screwed up or down for adjustment.

The nuts T are connected to the follower by the yokes V, which admit of ready disconnection for removing the follower to fill the case.

The case being filled, and the follower connected to the nuts, the pulley, which stands between the collars and runs free from either, being shifted by the hand-lever L to connect with the collar H, will set the shaft D and screws in motion, and force the follower down till the lower projection S strikes the lower stop-nut U, and forces rod R down, which, turning shaft P, will draw the pulley G away from collar H to the space between it and collar I, where it will again run free till the bale is tied, and it is required to raise the follower again; then the said pulley is moved into gear with collar I, which, turning pinion K, will impart the requisite motion to the screw with which it gears, to raise the follower; and this turning shaft D, by its pinion F, will turn the other screw, and both ends of the follower will be raised till the projection S comes against the upper stop-nut and lifts rod R, which, turning shaft P in the opposite direction to that in which it moved it before, will shift the pulley G back again between the collars, when it will run free till the case is charged again.

Having thus described my invention,

I claim as new and desire to secure by Letters Patent—

1. The loose and shifting driving or band-pulley G, having its hub provided with clutches for adapting it to engage with collars H and I, which are fixed on the shaft, as and for the purpose specified.

2. The stop-rod R, having the stop-nuts U arranged to be acted on by the projection S of nut T, combined with the shifting-lever L, by means of the oscillating shaft, cranks, and link for shifting said lever, all substantially as specified.

CHARLES J. BEASLEY.

Witnesses:
   F. J. TAPPEY,
   RO. I. STEEL.